United States Patent
Chang et al.

(10) Patent No.: US 11,972,751 B2
(45) Date of Patent: Apr. 30, 2024

(54) METHOD AND APPARATUS FOR DETECTING VOICE END POINT USING ACOUSTIC AND LANGUAGE MODELING INFORMATION FOR ROBUST VOICE

(71) Applicant: IUCF-HYU (INDUSTRY-UNIVERSITY COOPERATION FOUNDATION HANYANG UNIVERSITY), Seoul (KR)

(72) Inventors: Joon-Hyuk Chang, Seoul (KR); Inyoung Hwang, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 354 days.

(21) Appl. No.: 17/441,809

(22) PCT Filed: Jun. 29, 2020

(86) PCT No.: PCT/KR2020/008453
§ 371 (c)(1),
(2) Date: Sep. 22, 2021

(87) PCT Pub. No.: WO2021/010617
PCT Pub. Date: Jan. 21, 2021

(65) Prior Publication Data
US 2022/0230627 A1    Jul. 21, 2022

(30) Foreign Application Priority Data
Jul. 17, 2019    (KR) .................. 10-2019-0086305

(51) Int. Cl.
    *G10L 15/02*      (2006.01)
    *G06N 3/045*      (2023.01)
    (Continued)

(52) U.S. Cl.
    CPC .............. *G10L 15/02* (2013.01); *G06N 3/045* (2023.01); *G06N 3/063* (2013.01); *G10L 15/01* (2013.01);
    (Continued)

(58) Field of Classification Search
USPC ...................................... 704/1–504
See application file for complete search history.

(56) References Cited

U.S. PATENT DOCUMENTS

| 5,596,680 A | * | 1/1997 | Chow ..................... G10L 25/87 |
| | | | 704/E11.005 |
| 10,395,654 B2 | * | 8/2019 | Golipour ................. G10L 15/22 |

(Continued)

FOREIGN PATENT DOCUMENTS

| JP | 2015-212732 A | 11/2015 |
| KR | 10-2001-0091093 A | 10/2001 |

(Continued)

OTHER PUBLICATIONS

Roland Maas et al., "Combining Acoustic Embeddings and Decoding Features for End-of-Utterance Detection in Real-Time Far-Field Speech Recognition Systems", Apr. 30, 2019, pp. 1-5.

(Continued)

*Primary Examiner* — Marcus T Riley
(74) *Attorney, Agent, or Firm* — Sughrue Mion, PLLC

(57) ABSTRACT

Disclosed are a method and an apparatus for detecting a voice end point by using acoustic and language modeling information to accomplish strong voice recognition. A voice end point detection method according to an embodiment may comprise the steps of: inputting an acoustic feature (Continued)

vector sequence extracted from a microphone input signal into an acoustic embedding extraction unit, a phonemic embedding extraction unit, and a decoder embedding extraction unit, which are based on a recurrent neural network (RNN); combining acoustic embedding, phonemic embedding, and decoder embedding to configure a feature vector by the acoustic embedding extraction unit, the phonemic embedding extraction unit, and the decoder embedding extraction unit; and inputting the combined feature vector into a deep neural network (DNN)-based classifier to detect a voice end point.

15 Claims, 8 Drawing Sheets

(51) Int. Cl.
*G06N 3/063* (2023.01)
*G10L 15/01* (2013.01)
*G10L 15/18* (2013.01)
*G10L 15/187* (2013.01)
*G10L 15/22* (2006.01)

(52) U.S. Cl.
CPC ........ *G10L 15/1815* (2013.01); *G10L 15/187* (2013.01); *G10L 15/22* (2013.01); *G10L 2015/025* (2013.01)

(56) References Cited

U.S. PATENT DOCUMENTS

| | | | | |
|---|---|---|---|---|
| 10,650,807 | B2* | 5/2020 | Bocklet | G10L 15/22 |
| 2018/0268806 | A1* | 9/2018 | Chun | G10L 13/027 |
| 2018/0330729 | A1* | 11/2018 | Golipour | G10L 15/26 |
| 2019/0043488 | A1* | 2/2019 | Bocklet | G10L 15/22 |
| 2022/0230627 | A1* | 7/2022 | Chang | G10L 15/01 |

FOREIGN PATENT DOCUMENTS

| | | |
|---|---|---|
| KR | 10-2013-0134620 A | 12/2013 |
| KR | 10-2018-0097496 A | 8/2018 |

OTHER PUBLICATIONS

Shuo-Yiin Chang et al., "Endpoint detection using grid long short-term memory networks for streaming speech recognition", In Proc. Interspeech 2017, 2pages.

Roland Maas et al., "Combining Acoustic Embeddings and Decoding Features for End-of-Utterance Detection in Real-Time Far-Field Speech Recognition Systems", 2018 IEEE International Conference on Acoustic, Speech and Signal Processing(ICASSP), 2pages.

International Search Report for PCT/KR2020/008453 dated Sep. 18, 2020 [PCT/ISA/210].

* cited by examiner

METHOD AND APPARATUS FOR DETECTING VOICE END POINT USING ACOUSTIC AND LANGUAGE MODELING INFORMATION FOR ROBUST VOICE

CROSS REFERENCE TO RELATED APPLICATIONS

This application is a National Stage of International Application No. PCT/KR2020/008453 filed Jun. 29, 2020, claiming priority based on Korean Patent Application No. 10-2019-0086305 filed Jul. 17, 2019.

TECHNICAL FIELD

The following embodiments relate to a method and apparatus for detecting a voice end point using acoustic and language modeling information for robust voice recognition.

BACKGROUND ART

A voice end point detection method is a technology for detecting a point at which utterance is ended in a voice signal inputted to a microphone, and may be chiefly applied to a technology using device-server type voice recognition. Accurate voice recognition and a fast response are very important for a voice recognition-based artificial intelligence secretary service. A problem in that only voice recognition continues to be performed may occur because the end of utterance is not recognized although the utterance has ended and thus the end of the voice is not well detected. If a non-voice section during a voice is erroneously recognized as a point at which the voice is ended, a proper response cannot be made because a response is made based on text right before utterance during the utterance subsequently given by a user.

Meanwhile, causes of the degradation of performance in the technology for detecting a voice end point occur 1) due to latency until a voice end point is detected after utterance is ended and 2) because a non-voice section during utterance is erroneously recognized as a voice end point.

Non-patent Document 1 may propose a voice end point detection technology using a GLDNN in which a convolution layer of a convolutional, long short-term memory, deep neural network (CLDNN) recently used a lot in the voice recognition-related research is replaced with a grid-long short-term memory (GLSTM). In this case, the state of each frame is divided into a voice (a voice section), intermediate silence (a non-voice section during utterance), initial silence (a non-voice section before the utterance), and final silence (a non-voice section after the utterance). Performance of a voice end point detector based on the CLDNN and performance of a voice end point detector based on the GLDNN were compared. To use the GLDNN showed more excellence. This document has an advantage in that the moment when a voice is ended can be well detected by well modeling a relation between a voice feature vector and a voice state through the GLDNN from an acoustic feature vector, but a case where a non-voice section during utterance is erroneously recognized as a voice end point frequently occurs.

Non-patent Document 2 provides a voice end point detection technology using a method of training, by using an acoustic feature vector, a voice end point detector based on a long short-term memory (LSTM) by using a voice end point in a signal stage and a voice end point label in a word stage in order to improve voice end point detection performance, and of detecting a voice end point by using, as inputs, the last hidden layers of hidden states of two LSTMs and feature vectors (a non-voice section length of hypothesis having the highest probability, a non-voice section length interpolated as a likelihood, and a non-voice section length after utterance interpolated as a likelihood) of an online voice recognition decoder. This document has increased its performance by applying, as feature vectors for detecting a voice end point, decoder feature vectors which may be obtained through online voice recognition along with acoustic embedding information, but requires a large computational load because online voice recognition decoding must be processed and has a difficulty in applications because an embedded environment, such as a voice-based artificial intelligence speaker, has limited resources.

(Non-patent Document 1) S.-Y Chang, B. Li, T. N. Sainath, G. Simko, and C. Parada, "Endpoint detection using grid long short-term memory networks for streaming voice recognition", in Proceedings of Intervoice, 2017, pp. 3812-3816.

(Non-patent Document 2) R. Mass et al. "Combining acoustic embeddings and decoding features for end-point detection in real-time far-field voice recognition systems", ICASSP (International Conference on Acoustics, Voice, and Signal Processing), 2018.

DISCLOSURE

Technical Problem

Embodiments describe a method and apparatus for detecting a voice end point using acoustic and language modeling information for robust voice recognition, and more specifically, provide a voice end point detection technology capable of preventing a non-voice section during a voice from being erroneously recognized as the end point of the voice and rapidly making a response after a voice is ended, by concatenating acoustic embedding, phoneme embedding, and decoder embedding.

Embodiments provide a method and apparatus for detecting a voice end point using acoustic and language modeling information for robust voice recognition, which can improve voice end point detection performance by constructing a recurrent neural network-based voice end point detector using an acoustic feature vector, a language model-based end-of-utterance (EOU) detector, and an acoustic model, concatenating the last hidden layers of recurrent neural networks (RNNs) as acoustic embedding, decoder embedding and phoneme embedding, respectively, and then detecting a voice end point by inputting them to a classifier.

Technical Solution

A method of detecting a voice end point according to an embodiment may include inputting, to a recurrent neural network (RNN)-based acoustic embedding extractor, phoneme embedding extractor, and decoder embedding extractor, an acoustic feature vector sequence extracted from a microphone input signal; constructing a feature vector by concatenating acoustic embedding, phoneme embedding, and decoder embedding in the acoustic embedding extractor, the phoneme embedding extractor, and the decoder embedding extractor; and detecting an end point of a voice by inputting the concatenated feature vector to a deep neural network (DNN)-based classifier.

Each of the acoustic embedding extractor, the phoneme embedding extractor, and the decoder embedding extractor may be a gated recurrent unit (GRU)-based DNN model among recurrent neural networks (RNNs).

Constructing a feature vector by concatenating acoustic embedding, phoneme embedding, and decoder embedding may include constructing the feature vector by concatenating hidden states of last hidden layers of the acoustic embedding extractor, the phoneme embedding extractor, and the decoder embedding extractor.

Constructing a feature vector by concatenating acoustic embedding, phoneme embedding, and decoder embedding may include constructing an RNN-based voice end point detector using the acoustic feature vector sequence, an RNN-based EOU detector based on a language model, and an RNN-based acoustic model, and constructing one feature vector by concatenating the last hidden layers of the RNN-based voice end point detector, the RNN-based EOU detector based on a language model, and the RNN-based acoustic model as the acoustic embedding, the decoder embedding, and the phoneme embedding, respectively.

The method may further include training the acoustic embedding extractor, the phoneme embedding extractor, and the decoder embedding extractor by using the acoustic feature vector sequence in a training stage.

The method may further include training a classifier for detecting a voice end point. Training the acoustic embedding extractor, the phoneme embedding extractor, and the decoder embedding extractor may include separately training the RNN-based voice end point detector using the acoustic feature vector sequence, the RNN-based EOU detector based on the language model, and the RNN-based acoustic model in the training stage. Training a classifier may include training the classifier by concatenating hidden states of last hidden layers of the RNN-based voice end point detector, the RNN-based EOU detector based on the language model, and the RNN-based acoustic model as the acoustic embedding, the phoneme embedding, and the decoder embedding.

Detecting an end point of a voice by inputting the concatenated feature vector to a DNN-based classifier may include estimating a voice state by classifying each of frame of the feature vector as at least any one of a voice frame, a non-voice frame during utterance, a non-voice frame before the utterance, and a non-voice frame after the utterance; and defining, as a probability of an EOS, a probability value of a node corresponding to the non-voice section after the utterance among the estimated voice states for each frame and detecting, as the end point of the voice, a moment when the probability of the EOS becomes greater than a threshold.

The method may further include improving voice end point detection performance by joint-training the RNN-based acoustic embedding extractor, phoneme embedding extractor, and decoder embedding extractor for embedding extraction and the DNN-based classifier for classification.

An apparatus for detecting a voice end point according to another embodiment may include a feature extractor configured to input, to a recurrent neural network (RNN)-based acoustic embedding extractor, phoneme embedding extractor, and decoder embedding extractor, an acoustic feature vector sequence extracted from a microphone input signal; an embedding extractor configured to construct a feature vector by concatenating acoustic embedding, phoneme embedding, and decoder embedding in the acoustic embedding extractor, the phoneme embedding extractor, and the decoder embedding extractor; and a classifier configured to detect an end point of a voice by inputting the concatenated feature vector to a deep neural network (DNN)-based classifier.

Each of the acoustic embedding extractor, the phoneme embedding extractor, and the decoder embedding extractor may be a gated recurrent unit (GRU)-based DNN model among recurrent neural networks (RNNs).

The embedding extractor may construct the feature vector by concatenating hidden states of last hidden layers of the acoustic embedding extractor, the phoneme embedding extractor, and the decoder embedding extractor.

The embedding extractor may construct an RNN-based voice end point detector using the acoustic feature vector sequence, an RNN-based EOU detector based on a language model, and an RNN-based acoustic model, and may construct one feature vector by concatenating the last hidden layers of the RNN-based voice end point detector, the RNN-based EOU detector based on a language model, and the RNN-based acoustic model as the acoustic embedding, the decoder embedding, and the phoneme embedding, respectively.

The embedding extractor may separately train the RNN-based voice end point detector using the acoustic feature vector sequence, the RNN-based EOU detector based on the language model, and the RNN-based acoustic model in the training stage. The classifier may be trained by concatenating hidden states of last hidden layers of the RNN-based voice end point detector, the RNN-based EOU detector based on the language model, and the RNN-based acoustic model as the acoustic embedding, the phoneme embedding, and the decoder embedding in a training stage.

The classifier may estimate a voice state by classifying each of frame of the feature vector as at least any one of a voice frame, a non-voice frame during utterance, a non-voice frame before the utterance, and a non-voice frame after the utterance, and may define, as a probability of an EOS, a probability value of a node corresponding to the non-voice section after the utterance among the estimated voice states for each frame and detecting, as the end point of the voice, a moment when the probability of the EOS becomes greater than a threshold.

Voice end point detection performance can be improved by joint-training the RNN-based acoustic embedding extractor, phoneme embedding extractor, and decoder embedding extractor for embedding extraction and the DNN-based classifier for classification.

Advantageous Effects

According to embodiments, there can be provided a voice end point detection technology capable of preventing a non-voice section during a voice from being erroneously recognized as the end point of the voice by concatenating acoustic embedding information, phoneme embedding information, and decoder embedding information and of rapidly making a response after a voice is ended.

According to embodiments, there can be provided the method and apparatus for detecting a voice end point using acoustic and language modeling information for robust voice recognition, which can improve voice end point detection performance by constructing a recurrent neural network-based voice end point detector using an acoustic feature vector, a language model-based end-of-utterance (EOU) detector, and an acoustic model, concatenating the last hidden layers of recurrent neural networks as acoustic embedding, decoder embedding and phoneme embedding, respectively, and then detecting a voice end point by inputting them to a classifier.

BEST MODE FOR INVENTION

Figure 1:
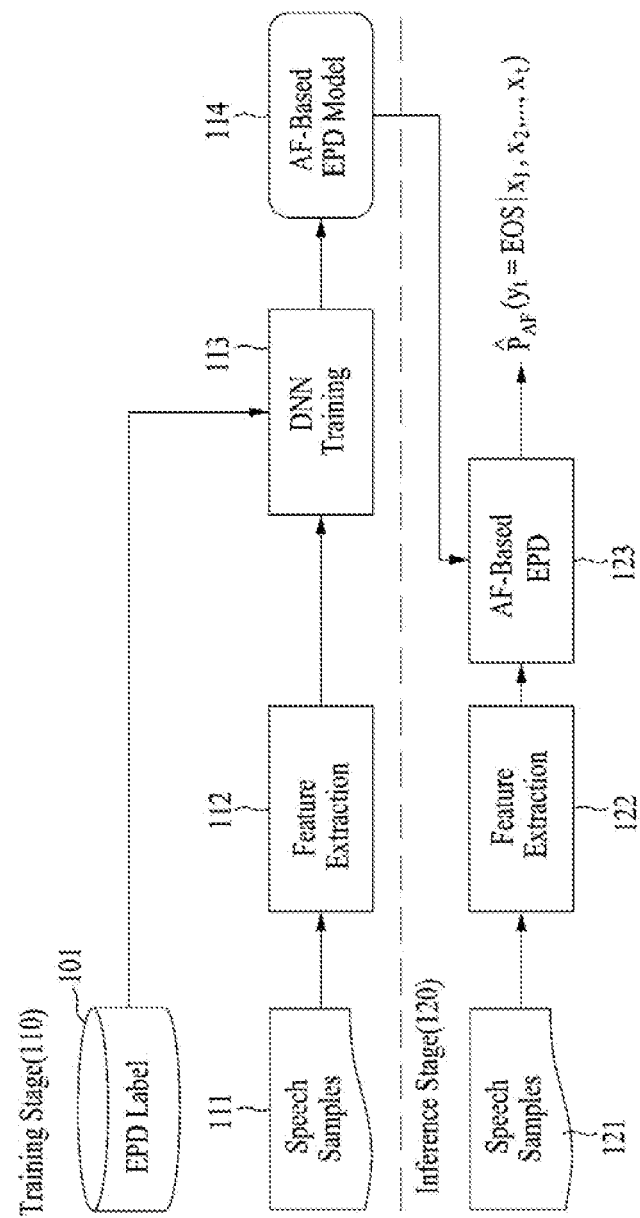
FIG. 1 is a block diagram for describing an apparatus for detecting a voice end point based on acoustic feature vector embedding according to an embodiment.

Hereinafter, embodiments of the present disclosure are described with reference to the accompanying drawings. However, the described embodiments may be modified in various other forms, and the scope of the present disclosure is not restricted by the following embodiments. Furthermore, various embodiments are provided to more fully describe the present disclosure to a person having average knowledge in the art. The shapes, sizes, etc. of elements in the drawings may be exaggerated for a clear description.

A voice end point detection technology is a technology for detecting, in a voice signal inputted to a microphone, the moment when utterance is ended after the utterance starts. Recently, an artificial intelligence voice-based secretary technology, such as a smart speaker, uses a device-server-based voice recognition technology. A device performs pre-processing technologies, such as noise cancellation/dereverberation/noise cancellation, and transmits an estimated clean voice signal to a server. The server provides information required by a user by performing large vocabulary continuous language voice recognition, natural language processing, etc. The device detects the end point of a voice and transmits, to the server, information until a point at which the voice is ended. The server provides information to the user by processing the information.

Accordingly, if the end of utterance is erroneously recognized before the utterance is ended or the progress of utterance is erroneously recognized even after the utterance is ended due to surrounding noise because voice end point detection performance has been degraded, a normal service may be difficult and a user may feel inconvenient.

In the following embodiments of the present disclosure, in order to accurately and rapidly detect a voice end point in a microphone input signal in an environment in which noise and reverberation are present, acoustic embedding, phoneme embedding, and decoder embedding may be concatenated. To this end, the end point of utterance can be finally detected through a deep neural network (DNN)-based classifier by training a probability estimator for an EOS token based on an RNN-based voice end point detector, an RNN-based acoustic model and an RNN-based language model using an acoustic feature vector and concatenating the last hidden layers of models as acoustic embedding, phoneme embedding, and decoder embedding, respectively. Performance of the proposed voice end point detection technology was evaluated in a simulation environment and a real environment compared to the existing technology. It was found that the proposed voice end point detection method showed better voice end point performance and showed a lower voice error recognition rate compared to the existing technology when applied to online voice recognition.

Hereinafter, a method and apparatus for detecting a voice end point based on a DNN in which acoustic feature vector embedding and voice recognition context are joint-trained are described. Furthermore, a method and apparatus for detecting a voice end point based on a DNN in which acoustic feature vector embedding and voice recognition context are joint-trained, to which phoneme embedding has been added, for better voice end point detection performance are described. In this case, a voice end point detection technology based on a DNN in which acoustic feature vector embedding and voice recognition context are joint-trained, to which phoneme embedding has been added, may mean a method and apparatus for detecting a voice end point using acoustic and language modeling information for robust voice recognition.

There are provided a DNN-based voice end point detector for estimating the probability of a voice end point through acoustic feature vector embedding and a DNN-based voice end point detection technology for estimating the probability of a voice end point through voice recognition context (information). There is provided a voice end point detection technology for estimating the probability of a voice end point by concatenating states of the hidden layers of networks. This can reduce a latency time upon detection of a voice end point through acoustic information, and can reduce a phenomenon in which a non-voice section during a voice is erroneously recognized as the end point of the voice through voice recognition context. Furthermore, efficiency can be improved because a server can perform voice recognition on only a voice section.

Meanwhile, the existing voice end point detection technology can prevent a non-voice section during utterance from being erroneously detected as a voice end point by concatenating the hidden states of the last hidden layers of two LSTM models, trained using label information of a voice end point in a signal stage and a voice end point in a word stage which are manually labeled from an acoustic feature vector sequence, and a decoder feature vector obtained by an online voice recognition decoder. However, this technology has a difficulty in being applied to an embedded environment having relatively limited system resources because online voice recognition that requires a large computational load and a memory must be actually performed.

In an embodiment of the present disclosure, in order to solve such a problem, the detection of a voice end point may be performed by constructing a DNN modeling the probability that an EOS token will appear subsequently based on the results of decoding so far from voice recognition results and concatenating the hidden state of the last hidden layer of the DNN and acoustic feature vector embedding information. A voice end point detection technology according to embodiments can well overcome that a voice end point is erroneously recognized with respect to a non-voice section during utterance compared to the existing technology, and can reduce latency occurring in recognizing a voice end point after utterance is ended.

Furthermore, in order to incorporate a decoder state without a real decoding process, an EOU detector for estimating the probability of an EOS token for each frame from 1-best hypothesis obtained through an offline voice recognizer may be proposed. In this case, acoustic embedding and voice recognition embedding may be concatenated, and a voice end point can be finally detected through a classifier.

FIG. 1 is a block diagram for describing an apparatus for detecting a voice end point based on acoustic feature vector embedding according to an embodiment.

FIG. 1 illustrates a training and inference process of the apparatus for detecting a voice end point based on acoustic feature vector embedding.

In a training stage 110, a feature extractor 112 may extract an acoustic feature vector sequence from a voice signal 111 inputted to a microphone. A DNN model unit 113 may classify frames of the extracted acoustic feature vector sequence into a voice frame, a non-voice frame during utterance, a non-voice frame before the utterance, and a non-voice frame after the utterance with reference to an EPD label database 101.

The DNN model unit 113 may be trained through a stochastic gradient descent (SGD)-based back-propagation algorithm so that a cost function is reduced by using a cross entropy error function as a cost function in order to train a recurrent neural network (RNN) model for modeling a relation between a feature vector sequence for each frame and a state (a voice, a non-voice during utterance, a non-voice before the utterance, or a non-voice after the utterance) of a voice of each frame.

In an inference stage 120, a feature extractor 122 may extract an acoustic feature vector sequence from a voice signal 121. An AF-based EPD 123 may estimate the probability of a state of a voice from the feature vector sequence for each frame through the trained model 114. In this case, the probability of a non-voice after utterance is defined as the probability of an EOS.

Hereinafter, the training and inference process of the apparatus for detecting a voice end point based on acoustic feature vector embedding is more specifically described.

A voice end point detection technology based on acoustic feature vector embedding is based on a model for classifying frames of a feature vector sequence extracted from a voice signal inputted to a microphone into a voice frame, a non-voice frame during utterance, a non-voice frame before the utterance, and a non-voice frame after the utterance.

The voice end point detection technology based on acoustic feature vector embedding according to an embodiment may use a deep neural network (DNN) model based on a recurrent neural network (RNN) in order to well model a short-term/long-term change of a voice feature vector. An RNN model includes a standard RNN, a gated recurrent unit (GRU) and a long short-term memory (LSTM). The GRU is described below as an example of the RNN model. In this case, the GRU is an example of the RNN model, and the present disclosure is not limited thereto. The GRU may be defined as in the following equation.

$$r_t = \sigma(U_{rx}x_t + U_{rh}h_{t-1} + br)$$

$$z_t = \sigma(U_{zx}x_t + U_{zh}h_{t-1} + bz)$$

$$\tilde{h}_t = \tanh(U_{\tilde{h}x}x_t + U_{\tilde{h}h}(r_t \odot h_{t-1})) + b_{\tilde{h}}$$

$$h_t = (1-z_t) \odot \tilde{h}_t + z_t \odot h_{t-1}$$

$$y_t = h_t \qquad \text{[Equation 1]}$$

wherein $r_t$ and $z_t$ indicate a forget gate and an update gate, respectively. $\tilde{h}_t$ indicates a temporary hidden state of a current frame. $h_t$ indicate a hidden state. $\sigma$ indicates a sigmoid function. $U_{rx}$, $U_{zx}$, $U_{\tilde{h}x}$ indicates a forward connection. $U_{rh}$, $U_{zh}$, $U_{\tilde{h}h}$ indicates a recurrent connection.

A voice state may be calculated as the following equation from an input acoustic feature vector by using the GRU.

$$h1_t^{AF} = \text{RNN}(x_t, \Theta_{h1}^{AF})$$

$$h2_t^{AF} = \text{RNN}(h1_t^{AF}, \Theta_{h2}^{AF})$$

$$P_{AF}(y_t, \text{EOS}) = \text{softmax}(h2_t^{AF}U_{AF} + b_{AF}) \qquad \text{[Equation 2]}$$

wherein $hn_t^{AF}$ indicates a state of an n-th hidden layer. $\Theta_{hn}^{AF}$ indicate a model parameter of the n-th hidden layer. $U_A$ and $b_A$ indicate a weight parameter and bias parameter of an output layer. The above model is trained using the SGD-based back-propagation algorithm, may use a cross entropy error function as a cost function, and may be represented as in the following equation.

$$E_{X_{ew}} = -\sum_{j=1}^{M}\sum_{k=1}^{K} l_k^{(j)} \log y_k^{(j)} \qquad \text{[Equation 3]}$$

wherein $l_k^{(j)}$ and $y_k^{(j)}$ indicate a calculated value and label value of a k-th output node for a j-th frame, respectively. M and K indicate a frame length and the number of output nodes, respectively.

In order to better recognize the end point of utterance in a voice signal inputted through a microphone, context of the voice signal needs to be well incorporated. In the existing research, to this end, after a RNN-based voice end point detector based on an acoustic feature vector and an RNN-based EOU detector for estimating the probability of an EOS token are trained, the last hidden layers of two RNN models may be trained through acoustic embedding and decoder embedding, respectively, and a voice end point may be detected through a classifier. However, in this case, the EOU detector may generally model context for voice recognition, but needs to incorporate phoneme context indicative of pronunciation information for finer modeling.

According to an embodiment, better voice end point detection performance may be derived by adding phoneme embedding to the voice end point detection technology using acoustic embedding and decoder embedding. To this end, the RNN-based voice end point detector using an acoustic feature vector and the RNN-based EOU detector may be trained. An RNN-based acoustic model may be additionally trained. The last hidden layers of models may be concatenated into one feature vector as acoustic embedding, decoder embedding and phoneme embedding, respectively. A voice end point may be finally detected through a classifier.

Accordingly, the acoustic model for classifying phonemes in an input acoustic feature vector by using the GRU may be calculated as in the following equation.

$$h1_t^{PE} = \text{RNN}(x_t, \Theta_{h1}^{PE})$$

$$h2_t^{PE} = \text{RNN}(h1_t^{PE}, \Theta_{h2}^{PE})$$

$$P_{PE}(y_t, \text{EOS}) = \text{softmax}(h2_t^{PE}U_{PE} + b_{PE}) \qquad \text{[Equation 4]}$$

wherein $hn_t^{PE}$ indicates a state of an n-th hidden layer. $\Theta_{hn}^{PE}$ indicates a model parameter of the n-th hidden layer. $U_{PE}$ and $b_{PE}$ indicate a weight parameter and bias parameter of an output layer. In order to train the acoustic model, as in the voice end point detector using an acoustic feature vector, the acoustic model may be trained using the SGD-based back-propagation algorithm, and may use a cross entropy error function as a cost function.

Accordingly, the voice end point detection technology according to embodiments can prevent a non-voice section during a voice from being erroneously recognized as the end point of the voice and can rapidly make a response by concatenating acoustic embedding, phoneme embedding, and decoder embedding. Furthermore, a device-server type voice recognizer of a server processes only a voice section. Accordingly, resources of the server can be more efficiently operated because up to a non-voice section is prevented from being decoded.

Figure 2:
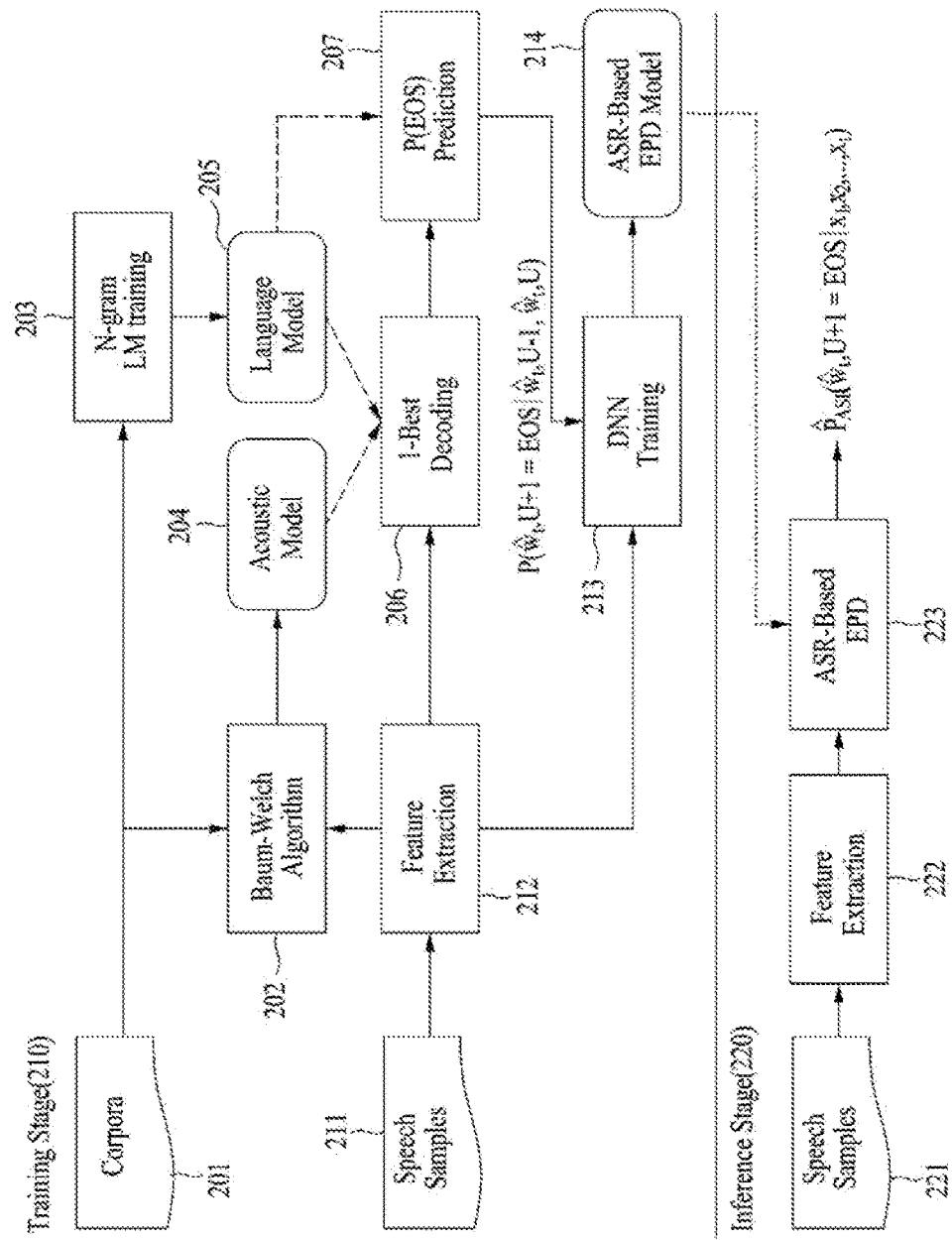
FIG. 2 is a block diagram for describing an apparatus for detecting a voice end point based on voice recognition context according to an embodiment.

FIG. 2 is a block diagram for describing an apparatus for detecting a voice end point based on voice recognition context according to an embodiment.

FIG. 2 illustrates a training and inference process of the apparatus for detecting a voice end point based on voice recognition context.

In a training stage 210, first, an acoustic model 204 based on a GMM-HMM and an N-gram language model 205 may be constructed using a Baum-Welch algorithm 202. After training data is decoded (206) using the acoustic model 204 and the N-gram language model 205, a word string having the highest probability may be extracted in a frame unit, and the last two words may be converted to have a probability in which an EOS will subsequently appear (207). Thereafter, a DNN model unit 213 may define a mean square error (MSE) as a cost function, and may learn an acoustic feature vector sequence, extracted from a voice signal 211 through a feature extractor 212, and a probability pair that an EOS token will appear.

In an inference stage 220, an ASR-based EPD 223 may calculate a probability that an EOS will subsequently appear for each frame from an acoustic feature vector sequence extracted from a voice signal 221 through a feature extractor 222.

Hereinafter, a training and inference process of the apparatus for detecting a voice end point based on voice recognition context is more specifically described.

The voice end point detection technology based on voice recognition context may define, as the probability of an EOS, a probability that an EOS token will subsequently appear after the last (N−1) word by applying a language model from a word string having the highest probability during online voice recognition. First, voice recognition is a technology for estimating a word string that is most matched from a feature vector sequence inputted to a microphone, and may be represented as in the following equation.

$$\hat{w} = \arg_w \max P(x|w)P(w) \quad \text{[Equation 5]}$$

wherein $P(Y|\omega)$ and $P(\omega)$ may be determined by an acoustic model and a language model, respectively. The language model is a model that estimates the probability of a current word based on a previous word string. In general, the language model may be approximated as N-gram according to a Markov chain rule, and may be represented as in the following equation.

$$P(w_i|w_1, w_2, \ldots, w_{i-1}) \approx P(w_i|w_{i-N}, w_{i-N+2}, \ldots, w_{i-1}) \quad \text{[Equation 6]}$$

wherein N indicates a degree of the language model. In general, a 3-gram language model is chiefly used. The 3-gram language model may be defined as in the following equation.

$$P(w_i | w_{i-2}, w_{i-1}) = \frac{\text{count}(w_{i-2}, w_{i-1}, w_i)}{\text{count}(w_{i-2}, w_{i-1})} \quad \text{[Equation 7]}$$

The greatest problem of the language model is the scarcity of data. In order to solve this problem, the discounting and backoff algorithm is chiefly used. The discounting and backoff algorithm is a technology in which a probability not defined in an N-gram-based language model is substituted with an (N−1)-gram language model, and may be represented as in the following equation.

$$P_{backoff}(w_i|w_{i-2}, w_{i-1}) = \quad \text{[Equation 8]}$$

$$\begin{cases} d \dfrac{\text{count}(w_{i-2}, w_{i-1}, w_i)}{\text{count}(w_{i-2}, w_{i-1})} & \text{if } 0 < \text{count}(w_{i-2}, w_{i-1}, w_i) \le C' \\ \dfrac{\text{count}(w_{i-2}, w_{i-1}, w_i)}{\text{count}(w_{i-2}, w_{i-1})} & \text{if } \text{count}(w_{i-2}, w_{i-1}, w_i) > C' \\ \alpha(w_{i-2}, w_{i-1}) P(w_i|w_{i-1}) & \text{otherwise} \end{cases}$$

wherein d indicates a discount coefficient. C' indicates a threshold for a discount condition. Furthermore, α indicates a backoff parameter. Furthermore, $P(w_i|w_{i-1})$ may be calculated by the discounting and backoff algorithm depending on a condition.

A language model for calculating a probability that an EOS token will appear through [Equation 7] and [Equation 8] may be defined as in the following equations.

$$P(EOS | w_{i-2}, w_{i-1}) = \frac{\text{count}(w_{i-2}, w_{i-1}, EOS)}{\text{count}(w_{i-2}, w_{i-1})} \quad \text{[Equation 9]}$$

$$P_{backoff}(w_i|w_{i-2}, w_{i-1}) = \quad \text{[Equation 10]}$$

$$\begin{cases} d \dfrac{\text{count}(w_{i-2}, w_{i-1}, EOS)}{\text{count}(w_{i-2}, w_{i-1})} & \text{if } 0 < \text{count}(w_{i-2}, w_{i-1}, EOS) \le C' \\ \dfrac{\text{count}(w_{i-2}, w_{i-1}, EOS)}{\text{count}(w_{i-2}, w_{i-1})} & \text{if } \text{count}(w_{i-2}, w_{i-1}, EOS) > C' \\ \alpha(w_{i-2}, w_{i-1}) P(EOS|w_{i-1}) & \text{otherwise} \end{cases}$$

Voice recognition is a problem with [Equation 5]. A word string having the highest probability in the results of decoding of a feature vector x[1:t] corresponding to 1 to t may be represented as in the following equation.

$$\hat{\omega} = \arg_\omega \max P(x[1:t]|\omega)P(\omega) \quad \text{[Equation 11]}$$

A probability that an EOS corresponding to the time t will subsequently appear may be represented as $P(\hat{\omega}_{t,V+1} = EOS)$ $|\hat{\omega}_{t,V-1}, \hat{\omega}_{t,V})$ through [Equation 10] and [Equation 11]. In this case, V indicates the number of words in a word string having the highest probability in the results of decoding up to the time t.

A voice end point detection technology based on a DNN model for estimating $P(\hat{\omega}_{t,V+1} = EOS)|\hat{\omega}_{t,V-1}, \hat{\omega}_{t,V})$ from a feature vector sequence inputted to a microphone may regress the probability of an EOS by using a DNN model using an RNN model, and may be represented as in the following equation.

$$h1_t^{ASR} RNN(x_t, \Theta_{h1}^{ASR})$$

$$h2_t^{ASR} RNN(h1_t^{ASR}, \Theta_{h2}^{ASR})$$

$$P_{ASR} = (\hat{\omega}_{t,V+1} = EOS) | \hat{\omega}_{t,V-1}, \hat{\omega}_{t,V}) = \sigma(h2_t^{ASR} U_{ASR} + b_{ASR})$$ [Equation 12]

wherein σ indicates a logistic sigmoid function.

In order to train the above model, the model is trained using the SGD-based back-propagation algorithm. The model may use a cross entropy error function as a cost function, and may be represented as in the following equation.

$$E_{MSE} = \frac{1}{2M} \sum_{j=1}^{M} (t^{(j)} - f^{(j)})^2$$ [Equation 13]

Figure 3:
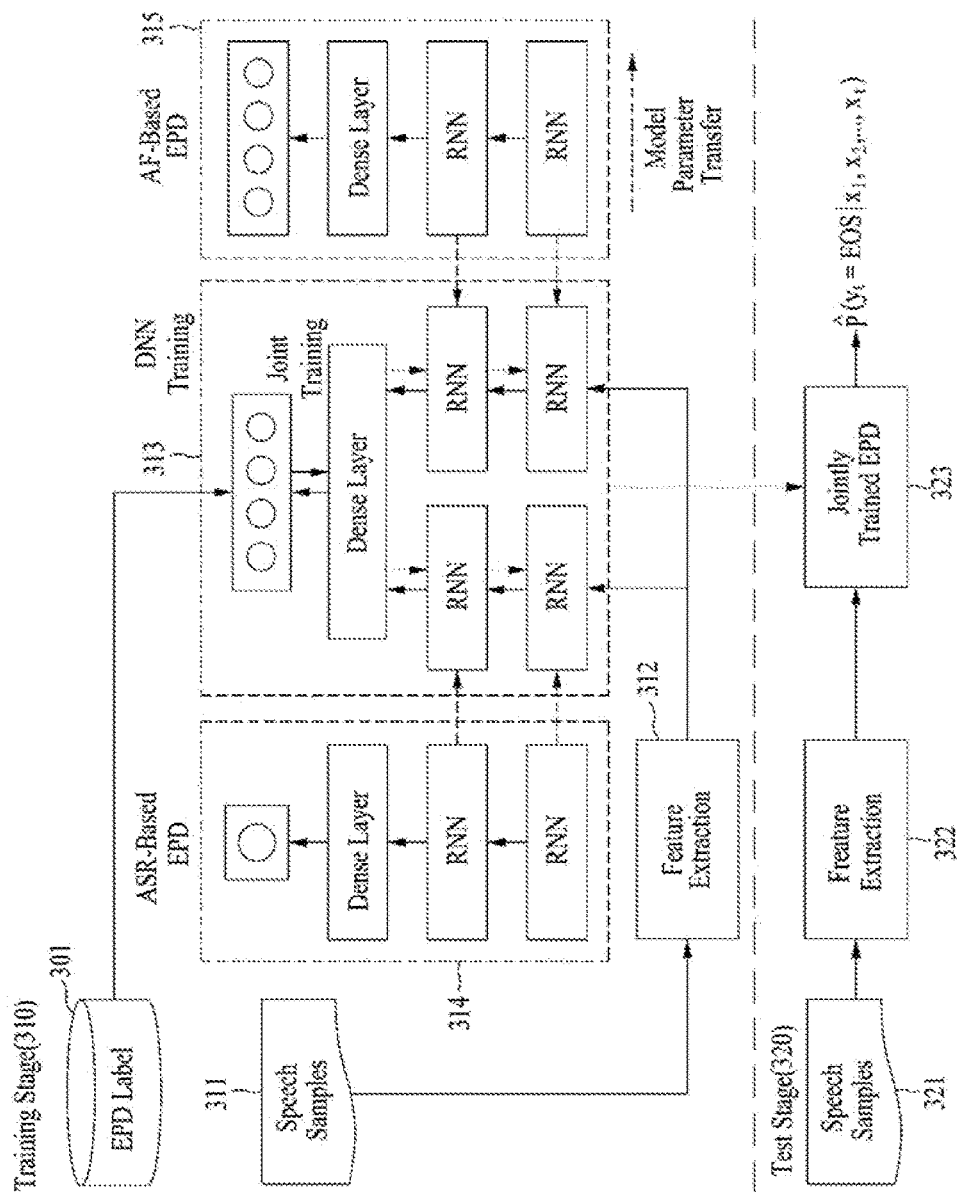
FIG. 3 is a block diagram for describing an apparatus for detecting a voice end point based on a deep neural network (DNN) in which acoustic feature vector embedding and voice recognition context are joint-trained according to an embodiment.

FIG. 3 is a block diagram for describing an apparatus for detecting a voice end point based on a deep neural network (DNN) in which acoustic feature vector embedding and voice recognition context are joint-trained according to an embodiment.

FIG. 3 illustrates a training and test process of the apparatus for detecting a voice end point based on a DNN in which acoustic feature vector embedding and voice recognition context are joint-trained according to an embodiment.

In a training stage 310, a feature extractor 312 may extract an acoustic feature vector sequence from a voice signal 311. The DNN model unit 313 of the apparatus for detecting a voice end point may concatenate hidden states of the last hidden layers of two DNN models including two GRUs, and may estimate a voice state from the hidden states. A first DNN model of the DNN model unit 313 may transfer a model parameter 315 of the trained DNN model for detecting a voice end point based on acoustic feature vector embedding. A second DNN model of the DNN model unit 313 may transfer a model parameter 314 of a model for detecting a voice end point based on voice recognition context. Thereafter, the model parameters of the two DNN models may be fixed, and a dense layer that models the concatenated hidden state and voice state for each frame may be trained. Finally, a model for detecting a state of the voice in the acoustic feature vector sequence may be optimized by joint-training all the dense layers and the parameters of the two DNN models.

In a test stage 320, a feature extractor 322 may extract an acoustic feature vector sequence from a voice signal 321. The apparatus for detecting a voice end point may estimate a voice state for each frame from the acoustic feature vector sequence, and may define, as the end point of a voice, a moment that first becomes greater than a threshold by defining, as the end point of utterance, a probability value of a node corresponding to the non-voice section after the utterance.

In other words, a DNN model for finally joint-training acoustic feature vector embedding and voice recognition context may be defined as in the following equation. In this case, the DNN model for joint-training acoustic feature vector embedding and voice recognition context may be an apparatus for detecting a voice end point based on a DNN in which acoustic feature vector embedding and voice recognition context are joint-trained, and may be included therein.

$$P_{joint}(y_t = EOS) = softmax([h2_t^{AF}, h2_t^{ASR}] U_{joint} + b_{joint})$$ [Equation 14]

$U_{joint}$ and $b_{joint}$ of the DNN model for joint-training acoustic feature vector embedding and voice recognition context is trained using the SGD-based back-propagation algorithm, and may use a cross entropy error function as a cost function. After the training is completed, all model parameters may be optimized by joint training $\Sigma_{h1}^{AF}, \Theta_{h2}^{AF}, U_{AF}, \Theta_{h1}^{ASR}, \Theta_{h1}^{ASR}, U_{joint}, b_{joint}$.

Hereinafter, the apparatus for detecting a voice end point based on a DNN in which acoustic feature vector embedding and voice recognition context are joint-trained according to an embodiment is more specifically described.

The apparatus for detecting a voice end point based on a DNN in which acoustic feature vector embedding and voice recognition context are joint-trained according to an embodiment may include the feature extractor and the DNN model unit.

The feature extractor 312 may input, to the first DNN model and the second DNN model, an acoustic feature vector sequence extracted from a microphone input signal.

The DNN model unit 313 may include two DNN models that receive the acoustic feature vector sequence from the feature extractor 312. More specifically, the DNN model unit 313 may receive the acoustic feature vector sequence from the feature extractor through the first DNN model and the second DNN model, and may detect the end point of a voice through the dense layer by concatenating the hidden states of the last hidden layers of the first DNN model and the second DNN model. In this case, each of the first DNN model and the second DNN model may be the GRU-based DNN model among RNNs.

Furthermore, according to an embodiment, each of the first DNN model and the second DNN model may include another RNN in addition to the GRU.

The first DNN model of the DNN model unit 313 may transfer a model parameter of the trained DNN model for detecting a voice end point based on acoustic feature vector embedding. Furthermore, the second DNN model of the DNN model unit may transfer a model parameter of the DNN model for detecting a voice end point based on voice recognition context.

In the training stage, the DNN model unit 313 may fix model parameters of the first DNN model and the second DNN model, may train the dense layer that models the hidden states of the last hidden layers of the concatenated first DNN model and second DNN model and a voice state for each frame, and may optimize a model for detecting a voice state in an acoustic feature vector sequence by joint-training all the model parameters of the dense layer and the first DNN model and the second DNN model.

In the test stage, the DNN model unit 313 may estimate a voice state by classifying each of frames of an acoustic feature vector sequence as at least any one of a voice frame, a non-voice frame during utterance, a non-voice frame before the utterance and a non-voice frame after the utterance, may define, as the probability of an EOS, a probability value of a node corresponding to a non-voice section after the utterance among the estimated voice states for each frame, and may detect, as the end point of the voice, the moment when the probability of an EOS becomes greater than a threshold.

Figure 4:
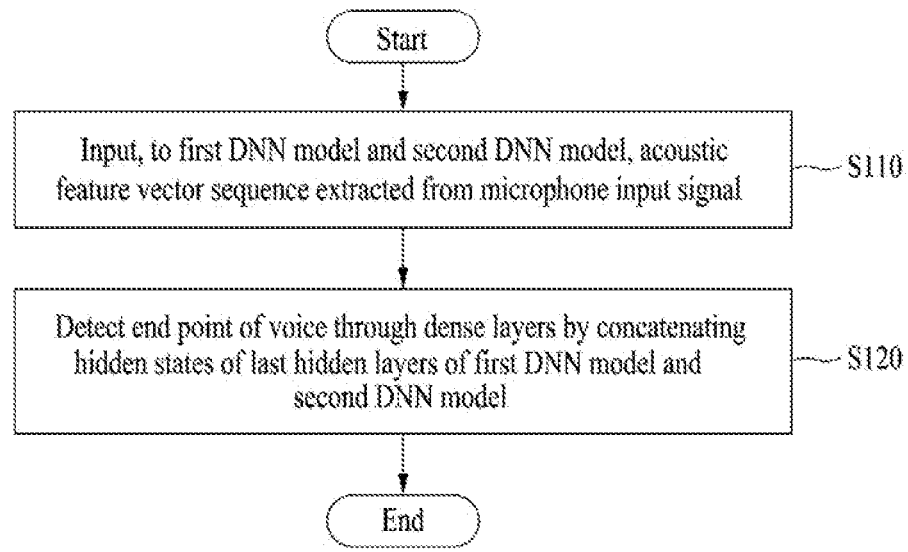
FIGS. 4 to 6 are flowcharts illustrating a method of detecting a voice end point based on a DNN in which acoustic feature vector embedding and voice recognition context are joint-trained according to an embodiment.
Figure 5:
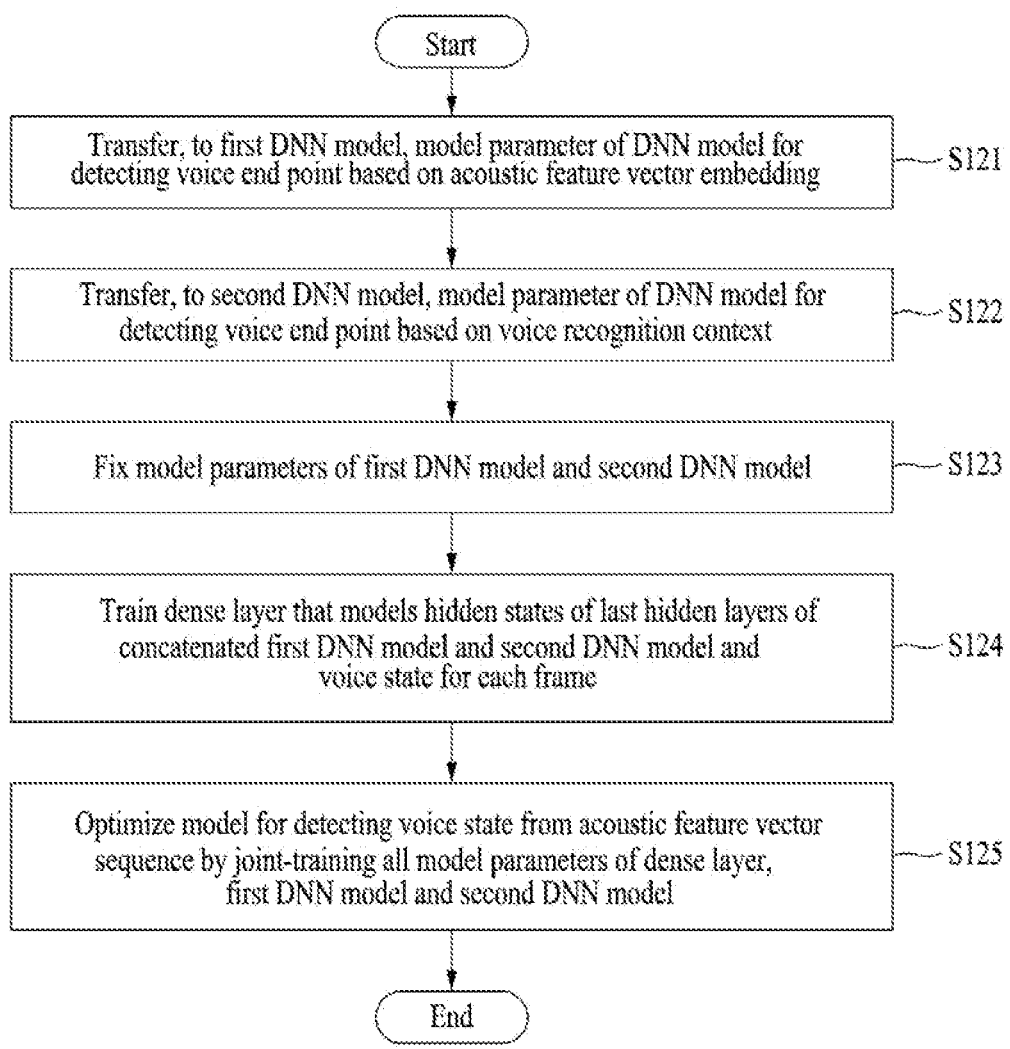
Figure 6:
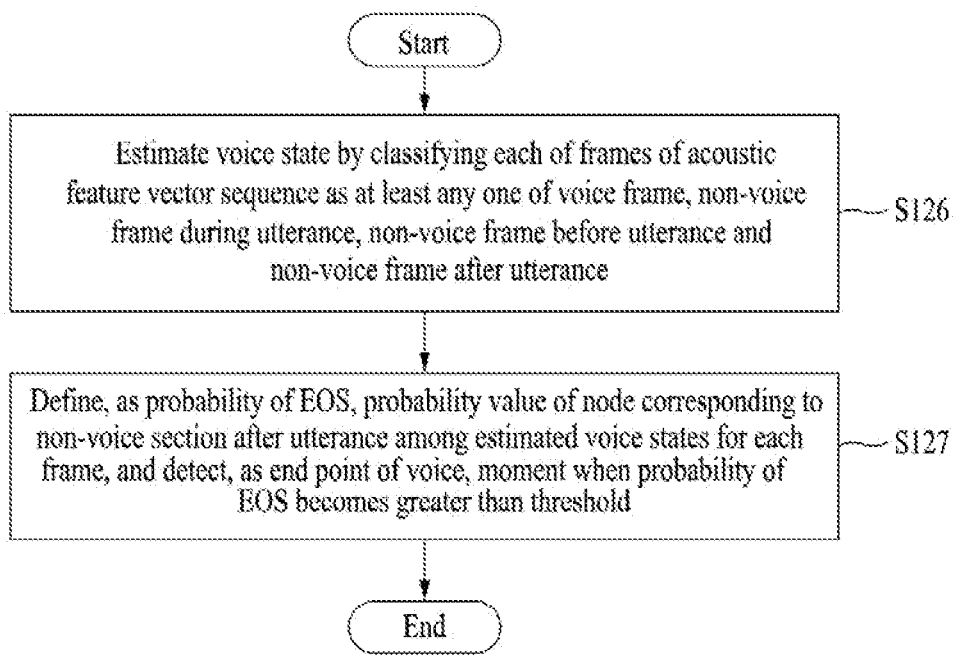

FIGS. 4 to 6 are flowcharts illustrating a method of detecting a voice end point based on a DNN in which acoustic feature vector embedding and voice recognition context are joint-trained according to an embodiment.

Referring to FIG. 4, the method of detecting a voice end point based on a DNN in which acoustic feature vector embedding and voice recognition context are joint-trained according to an embodiment may include step S110 of inputting, to the first DNN model and the second DNN model, an acoustic feature vector sequence extracted from a microphone input signal and step S120 of detecting the end point of a voice through the dense layers by concatenating hidden states of the last hidden layers of the first DNN model and the second DNN model.

Referring to FIG. 5, in a training stage, step S120 may include step S121 of transferring, to the first DNN model, a model parameter of the trained DNN model for detecting a voice end point based on acoustic feature vector embedding and step S122 of transferring, to the second DNN model, a model parameter of the trained DNN model for detecting a voice end point based on voice recognition context. Furthermore, step S120 may further include step S123 of training the first DNN model, the second DNN model and the dense layer for detecting a voice end point.

In this case, step S123 may further include steps of training the first DNN model to learn an acoustic feature vector and a voice state for each frame, directly training the second DNN model to learn the acoustic feature vector and the probability of an EOS from 1-best decoding hypothesis obtained through a trained voice recognizer, concatenating the last hidden layers of the first DNN model and the second DNN model, training the dense layer that models the hidden states of the concatenated last hidden layers and the voice states of the first DNN model and the second DNN model for each frame, and optimizing a model for detecting a voice state in the acoustic feature vector sequence by joint-training all the model parameters of the dense layers and the first DNN model and the second DNN model.

Referring to FIG. 6, in the test stage, step S120 may include step S124 of estimating a voice state by classifying each of frames of the acoustic feature vector sequence as at least any one of a voice frame, a non-voice frame during utterance, a non-voice frame before the utterance, and a non-voice frame after the utterance and step S125 of defining, as the probability of an EOS, a probability value of a node corresponding to a non-voice section after the utterance among the estimated voice states for each frame and detecting, as the end point of the voice, the moment when the probability of the EOS becomes greater than a threshold.

Hereinafter, the steps of the method of detecting a voice end point based on a DNN in which acoustic feature vector embedding and voice recognition context are joint-trained according to an embodiment are described.

The method of detecting a voice end point based on a DNN in which acoustic feature vector embedding and voice recognition context are joint-trained according to an embodiment may be more specifically described through the aforementioned apparatus for detecting a voice end point based on a DNN in which acoustic feature vector embedding and voice recognition context are joint-trained according to an embodiment. The apparatus for detecting a voice end point based on a DNN in which acoustic feature vector embedding and voice recognition context are joint-trained according to an embodiment may include the feature extractor and the DNN model unit.

In step S110, the feature extractor may input, to the first DNN model and the second DNN model, an acoustic feature vector sequence extracted from a microphone input signal.

In step S120, the DNN model unit may receive the acoustic feature vector sequence from the feature extractor through the first DNN model and the second DNN model, and may detect the end point of a voice through the dense layer by concatenating the hidden states of the last hidden layers of the first DNN model and the second DNN model.

In this case, each of the first DNN model and the second DNN model may be the GRU-based DNN model among RNNs. Furthermore, according to an embodiment, each of the first DNN model and the second DNN model may include another RNN in addition to the GRU.

In step S121, the DNN model unit may transfer, to the first DNN model, a model parameter of the trained DNN model for detecting a voice end point based on acoustic feature vector embedding.

In step S122, the DNN model unit may transfer, to the second DNN model, a model parameter of the DNN model for detecting a voice end point based on voice recognition context.

In step S123, the DNN model unit may train the first DNN model, the second DNN model and the dense layer for detecting a voice end point. The DNN model unit may train the first DNN model by using the acoustic feature vector and a voice state for each frame. Furthermore, the DNN model unit may directly train the second DNN model by using the acoustic feature vector and the probability of an EOS from 1-best decoding hypothesis obtained through a trained voice recognizer. Furthermore, the DNN model unit may concatenate the last hidden layers of the first DNN model and the second DNN model, and may train the hidden states of the concatenated last hidden layers of the first DNN model and the second DNN model and the dense layer that models the voice state for each frame.

In this case, the DNN model unit may be trained through the SGD-based back-propagation algorithm so that a cost function is reduced by using each of a cross entropy error function, a mean square error (MSE) function and a cross entropy error function as a cost function.

Furthermore, the DNN model unit may joint train all the model parameters of the dense layers and of the first DNN model and the second DNN model, and may optimize a model for detecting a voice state from the acoustic feature vector sequence.

Furthermore, in step S126, the DNN model unit may estimate a voice state by classifying each of frames of the acoustic feature vector sequence as at least any one of a voice frame, a non-voice frame during utterance, a non-voice frame before the utterance and a non-voice frame after the utterance.

In step S127, the DNN model unit may define, as the probability of an EOS, a probability value of a node corresponding to the non-voice section after the utterance among the estimated voice states for each frame, and may detect, as the end point of the voice, the moment when the probability of the EOS becomes greater than a threshold.

In particular, the DNN model unit may estimate the probability that an EOS token will subsequently appear through the last (N−1) word and the N-gram language model in a word string having the highest probability for each frame among the results of decoding of the acoustic feature vector sequence in the second DNN model.

Furthermore, the DNN model unit can improve performance by joint-training model parameters of the first DNN model and the second DNN model and a model parameter of the dense layer through the SGD-based back-propagation algorithm.

According to embodiments, the voice end point detection technology based on acoustic feature vector embedding information and the voice end point detection technology based on voice recognition context may be concatenated. To this end, the end point of a voice may be finally determined by concatenating the hidden states of the last hidden layers formed in detection processes of respective voice end point detectors.

The voice end point detection technology according to embodiments can induce the end point of a voice to be detected right after utterance is ended through acoustic feature vector embedding, and can prevent a non-voice section during the utterance from being erroneously recognized as the end point of the voice by using, as voice recognition information, the probability that an EOS token will appear after a word string having the highest probability decoded up to a current frame. If a user asks a question through a voice in a remote place, a response can be made within a minimum time right after the utterance is ended. Although a non-voice section is present in the utterance, corresponding information may be processed and provided after utterance for a question from the user is ended after waiting for subsequent utterance.

Hereinafter, a method and apparatus for detecting a voice end point based on a DNN in which acoustic feature vector embedding and voice recognition context are joint-trained, to which phoneme embedding has been added for better voice end point detection performance, are more specifically described. In this case, a voice end point detection technology based on a DNN in which acoustic feature vector embedding and voice recognition context are joint-trained, to which phoneme embedding has been added, may mean a method and apparatus for detecting a voice end point using acoustic and language modeling information for robust voice recognition.

Figure 7:
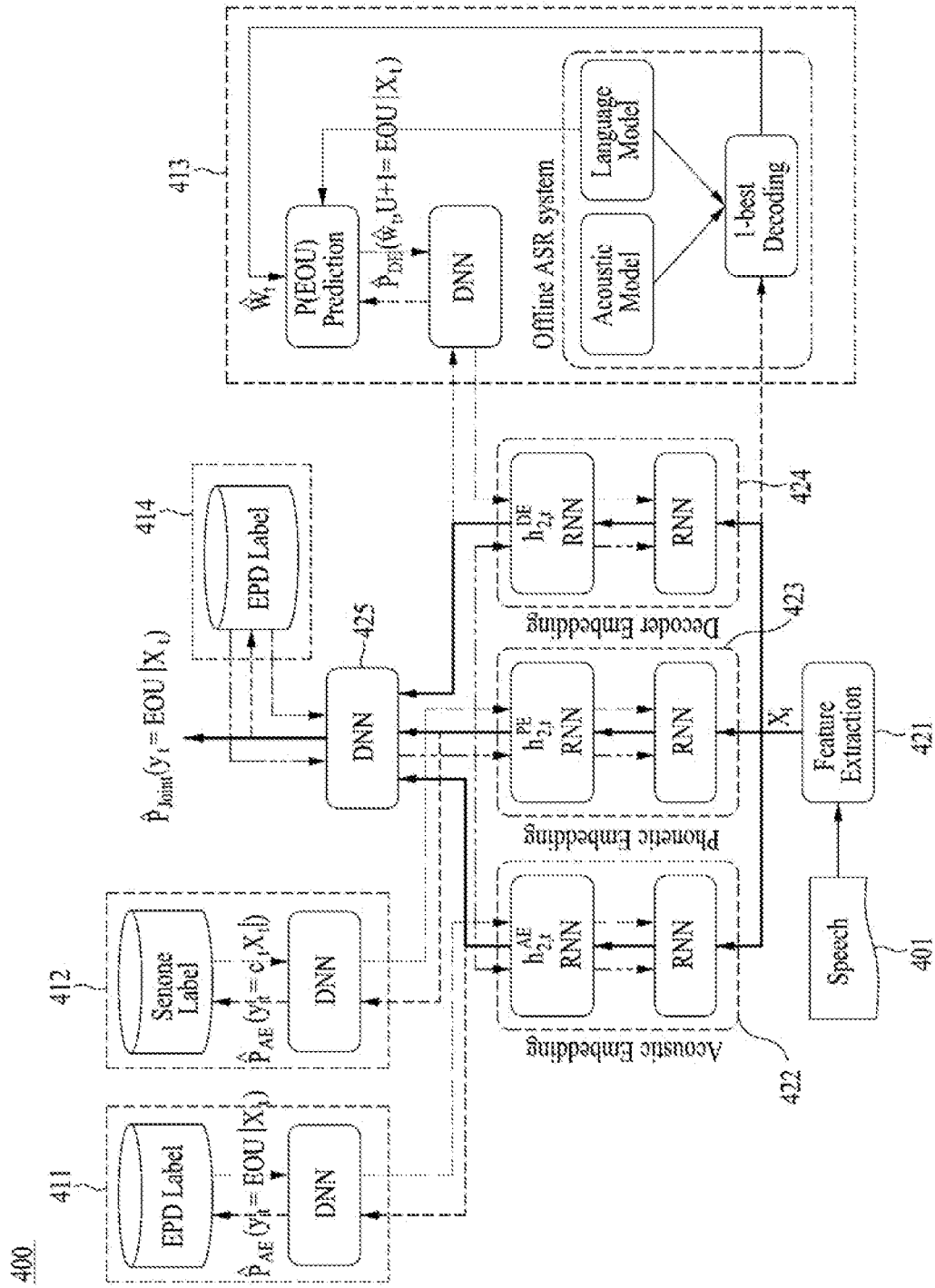
FIG. 7 is a block diagram for describing an apparatus for detecting a voice end point using acoustic and language modeling information for robust voice recognition according to an embodiment.

FIG. 7 is a block diagram for describing an apparatus for detecting a voice end point using acoustic and language modeling information for robust voice recognition according to an embodiment.

Referring to FIG. 7, the apparatus 400 for detecting a voice end point using acoustic and language modeling information for robust voice recognition according to an embodiment may construct an RNN-based voice end point detector using an acoustic feature vector, an RNN-EOU detector based a language model, and an RNN-based acoustic model in order to more accurately detect the end point of a voice, may concatenate the last hidden layers of the respective RNNs as acoustic embedding, decoder embedding and phoneme embedding, respectively, and may then detect the end point of a voice by inputting the concatenated hidden layers to a classifier 425.

This technology has an effect in that it can improve voice end point detection performance compared to the voice end point detection technology in which acoustic embedding and a decoder state feature vector are concatenated and the voice end point detection technology based on acoustic embedding and decoder embedding.

Furthermore, there is an effect in that execution can be performed using a small computational load because a decoder state is not obtained through actual decoding, but voice recognition context can be incorporated using an EOU detector based on a language model.

In particular, in a training stage, the RNN-based voice end point detector, the RNN-based acoustic model, and the RNN-based EOU probability estimator (EOU detector based on a language model) are separately trained using an acoustic feature vector. Hidden unit states of the last hidden layers may be concatenated as acoustic embedding, phoneme embedding, and decoder embedding, respectively, so that the DNN-based classifier 425 may be sequentially trained.

In this case, an alternate long and short dash line indicates a path of error reversion for the training of each module.

Thereafter, voice end point detection performance can be improved by joint-training the RNNs for embedding extraction and the DNN for classification. Furthermore, an alternate long and two short dashes line indicates a path of error reversion for joint training. 411, 412, 413, and 414 are used only in the training stage. Only 421, 422, 423, 424, and 425 are used only in a voice end point detection step.

The apparatus 400 for detecting a voice end point using acoustic and language modeling information for robust voice recognition according to an embodiment may include a feature extractor 421, embedding extractors 422, 423, and 424, and the classifier 425. In this case, the embedding extractors 422, 423, and 424 may include an acoustic embedding extractor 422, a phoneme embedding extractor 423 and a decoder embedding extractor 424. The apparatus 400 for detecting a voice end point using acoustic and language modeling information for robust voice recognition according to an embodiment is more specifically described.

Figure 8:
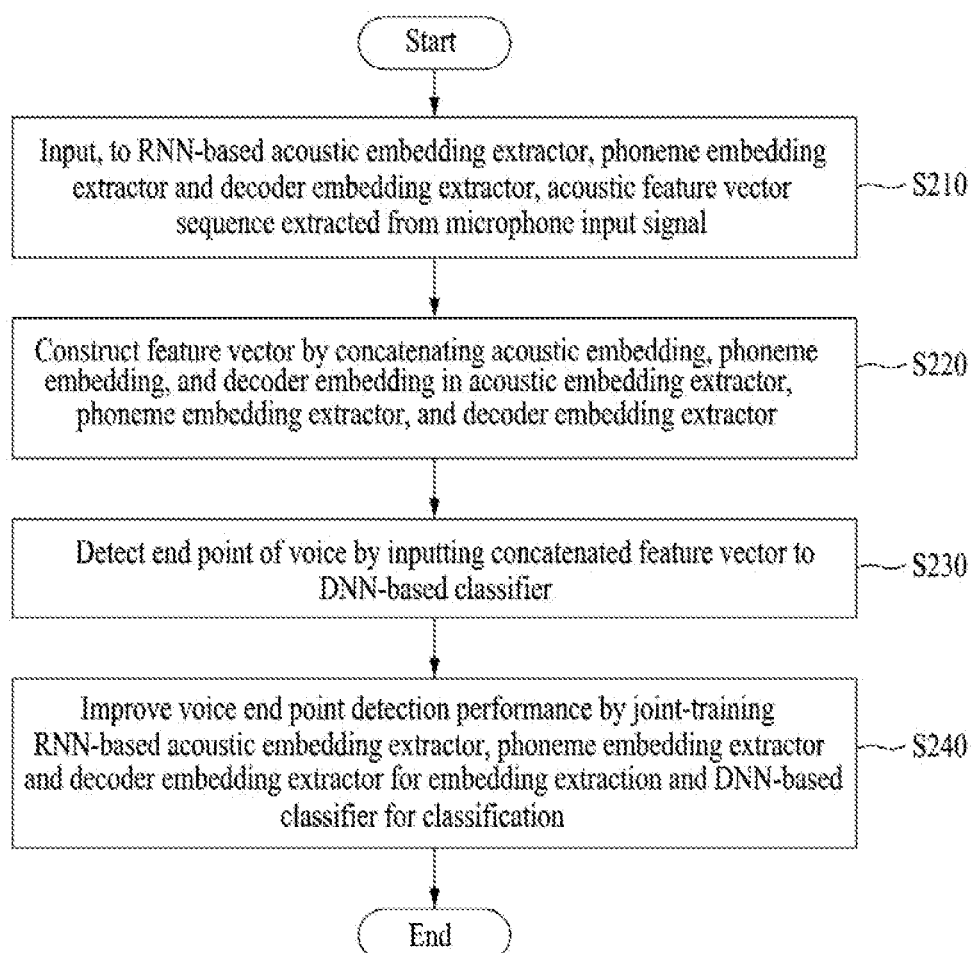
FIG. 8 is a flowchart illustrating a method of detecting a voice end point using acoustic and language modeling information for robust voice recognition according to an embodiment.

FIG. 8 is a flowchart illustrating a method of detecting a voice end point using acoustic and language modeling information for robust voice recognition according to an embodiment.

Referring to FIG. 8, the method of detecting a voice end point using acoustic and language modeling information for robust voice recognition according to an embodiment may include step S210 of inputting, to the RNN-based acoustic embedding extractor, phoneme embedding extractor and decoder embedding extractor, an acoustic feature vector sequence extracted from a microphone input signal, step S220 of constructing a feature vector by concatenating acoustic embedding, phoneme embedding, and decoder embedding in the acoustic embedding extractor, the phoneme embedding extractor, and the decoder embedding extractor, and step S230 of detecting the end point of a voice by inputting the concatenated feature vector to the DNN-based classifier.

The method may further include step S240 of improving voice end point detection performance by joint-training the RNN-based acoustic embedding extractor, phoneme embedding extractor and decoder embedding extractor for embedding extraction and the DNN-based classifier for classification.

Hereinafter, the steps of the method of detecting a voice end point using acoustic and language modeling information for robust voice recognition according to an embodiment are described.

The method of detecting a voice end point using acoustic and language modeling information for robust voice recognition according to an embodiment may be more specifically described through the apparatus for detecting a voice end point using acoustic and language modeling information for robust voice recognition according to an embodiment. The apparatus for detecting a voice end point using acoustic and language modeling information for robust voice recognition according to an embodiment may include the feature extractor, the embedding extractor and the classifier. In this case, the embedding extractor may include the acoustic embedding extractor, the phoneme embedding extractor, and the decoder embedding extractor.

First, in a training stage, the method may further include a step of training the acoustic embedding extractor, the phoneme embedding extractor and the decoder embedding extractor by using an acoustic feature vector sequence. Furthermore, the method may further include a step of training the classifier for detecting a voice end point. Accordingly, in the training stage, the embedding extractor may separately train the RNN-based voice end point detector, the RNN-based EOU detector based on a language model, and the RNN-based acoustic model by using an acoustic feature vector sequence. Furthermore, in the training stage, the classifier may be trained by concatenating hidden unit states of the last hidden layers of the RNN-based voice end point detector, the RNN-based EOU detector based on a language model, and the RNN-based acoustic model as acoustic embedding, phoneme embedding, and decoder embedding, respectively.

In step S210, the feature extractor may input, to the RNN-based acoustic embedding extractor, phoneme embedding extractor, and decoder embedding extractor, an acoustic feature vector sequence extracted from a microphone input signal. In this case, each of the acoustic embedding extractor, the phoneme embedding extractor, and the decoder embedding extractor may be a GRU-based DNN model among RNNs.

In step S220, the embedding extractor may construct a feature vector by concatenating the hidden states of the last hidden layers of the acoustic embedding extractor, the phoneme embedding extractor, and the decoder embedding extractor.

The embedding extractor may construct the feature vector by concatenating acoustic embedding, phoneme embedding, and decoder embedding in the acoustic embedding extractor, the phoneme embedding extractor, and the decoder embedding extractor. More specifically, the embedding extractor may construct the RNN-based voice end point detector using an acoustic feature vector sequence, the RNN-based EOU detector based on a language model, and the RNN-based acoustic model, and may construct one feature vector by concatenating the last hidden layers of the RNN-based voice end point detector, the RNN-based EOU detector based on a language model, and the RNN-based acoustic model as acoustic embedding, decoder embedding and phoneme embedding, respectively.

In step S230, the classifier may detect the end point of the voice by inputting the concatenated feature vector to the DNN-based classifier. The classifier may estimate a voice state by classifying each of frames of the feature vector as at least any one of a voice frame, a non-voice frame during utterance, a non-voice frame before the utterance, and a non-voice frame after the utterance, may define, as the probability of an EOS, a probability value of a node corresponding to the non-voice section after the utterance among the estimated voice states for each frame, and may detect, as the end point of the voice, the moment when the probability of the EOS becomes greater than a threshold.

In step S240, voice end point detection performance can be improved by joint-training the RNN-based acoustic embedding extractor, phoneme embedding extractor, and decoder embedding extractor for embedding extraction and the DNN-based classifier for classification.

As described above, according to embodiments, a DNN-based acoustic model including a bottleneck layer can be trained. The bottleneck layer may be used as a feature vector for the voice end point detection algorithm. Furthermore, a feature vector may be constructed by concatenating acoustic embedding, phoneme embedding, and decoder embedding. The end point of a voice may be detected through the classifier. Furthermore, in order to train the voice end point detector, the classifier may be trained from a feature vector by concatenating acoustic embedding, phoneme embedding, and decoder embedding.

Thereafter, performance can be improved by joint-training all the models.

Hereinafter, the results of experiments on performance are described. Performance of the voice end point detection technology based on acoustic embedding, phoneme embedding, and decoder embedding according to an embodiment of the present disclosure may be compared with each of the existing voice end point detection technology of Non-patent Document 1 and the existing voice end point detection technology of Non-patent Document 2. Furthermore, the voice end point detection technology in which acoustic feature vector embedding and voice recognition context are joint-trained based on acoustic embedding, phoneme embedding, and decoder embedding according to an embodiment may be compared with the voice end point detection technology based on a DNN.

For the present experiments, a Dict01 database of SiTEC was used. The corresponding database is a database in which sentences 41,666 spoken by each of 200 men and 200 women were constructed as a length of about 70 hours. In the voice database, each of the male and female speakers was divided into 152, 8, and 40 speakers. Sentences spoken by the 152, 8, and 40 speakers were used as training data of a DNN model for detecting a voice end point, validation data for early stopping, and test data, respectively. The voice data was manually labeled as four states (a voice frame, a non-voice frame during utterance, a non-voice frame before the utterance, and a voice frame after the utterance) of the voice, respectively, in a 10 ms unit. In order to model a noise and reverberation environment, voice data in a noise/reverberation environment may be generated by performing a convolution product of a room impulse response (RIR) and clean voice data and adding a noise signal. In this case, the RIR had a size of 3.37 m×5.57 m×2.0 m. RT60 secured in a space of 0.5 second was used. Noise data of a babble, a cafe, a car, an office, a pedestrian, a street, and white was secured in real environments, and 5, 10, 15 dB may be added as a signal-to-noise ratio (SNR). In this case, the office noise was added to only the test data and used for performance verification in an environment (unseen condition) which was not used upon training. A 64-dimension Mel-filterbank energy (MFBE) was used as the acoustic feature vector for detecting a voice end point.

A voice end point detector based on acoustic feature vector embedding may be trained using a voice state pair manually labeled with a feature vector sequence extracted as previously prepared voice data. A corresponding model may include two GRUs whose hidden state is a 100 order. In this case, a target vector may include a voice [1 0 0 0], a non-voice [0 1 0 0] during utterance, a non-voice [0 0 1 0] before the utterance, and a non-voice [0 0 0 1] after the utterance as a one-hot-vector. The DNN model was trained using the SGD-based back-propagation algorithm. In this case, a cross entropy error function may be used as a cost function.

In order to train the voice end point detector based on voice recognition context, first, the GMM-HMM-based voice recognizer may be trained using the clean voice data. As the results of the training, 161 phones were modeled as 128,298 Gaussians, and are mapped as a total of 5,960 tied states. A language model was composed of 3-gram, and out of vocabulary (OOV) of a pronouncing dictionary was 0%. As a result of decoding of validation data using the trained GMM-HMM-based acoustic model and the trained 3-gram language model, a word error rate (WER) may be measured as 0.75%.

Furthermore, in order to model a preliminary probability of an EOS token from the last two words of a word string having the highest probability among the decoded results, a separate language model may be constructed. The separate language model is a sub-model of the previously constructed language model, and includes only words of an EOR not all words. In order to train the voice end point detector using voice information of the voice data for each frame, a word string having the highest probability was extracted from the decoding results in a frame unit with respect to the training data by using the GMM-HMM-based language model and the 3-gram-based language model. Furthermore, in order to model the preliminary probability of the EOS token, a probability that an EOS token will subsequently appear may be calculated based on the last two words among the results of voice recognition in a frame unit by using a separate language model.

A DNN model for estimating the probability that an EOS token will subsequently appear may be trained based on the last two words of the results of voice recognition by using a probability string that an EOS token will subsequently appear based on an acoustic feature vector sequence extracted from a microphone input signal and the last two words of the results of voice recognition results upon decoding for each frame. The corresponding model may include two GRUs having a hidden state of a 100 order. The DNN model was trained using the SGD-based back-propagation algorithm. In this case, the mean square error (MSE) function was used as a cost function.

The DNN-based acoustic model for phoneme embedding may be trained using a previously prepared feature vector sequence and a previously prepared phoneme label string obtained through the voice recognizer. To this end, a phoneme string having the highest probability may be extracted by performing voice recognition on the test data, may be changed in a one-hot-vector form, and may be used for training. The acoustic model may include two GRUs whose hidden state is a 100 order. In the training process, the acoustic model was trained using the SGD-based back-propagation algorithm. In this case, the cross entropy error function may be used as a cost function.

States of the last hidden layers of the previously trained voice end point detector based on acoustic feature vector embedding, the voice end point detector based on voice recognition context, and the DNN-based acoustic model are concatenated and inputted to the classifier for detecting a voice end point. The end point of a voice may be detected based on the states. To this end, acoustic embedding, phoneme embedding, and decoder embedding may be derived by feed-forwarding the feature vector sequence. The classifier may be configured to classify frames into four states. In this case, the four states mean a voice frame, a non-voice frame before utterance, a non-voice frame after the utterance, and a non-voice frame during the utterance. The classifier model was trained using the SGD-based back-propagation algorithm. In this case, the cross entropy error function may be used as a cost function. After the training is completed, in order to improve voice end point detection performance, parameters of the three RNN models for embedding extraction and the classifier model based on a DNN may be joint-trained. The procedure is the same, but has a difference in that after the RNN for embedding extraction is fixed and only the classifier is trained, all the parameters are optimized at the same time.

Performance of each of the voice end point detection technologies was evaluated based on a time difference between a labeled voice end point frame and a frame obtained by detecting the end point of a voice. In particular, the voice end point detection technologies were evaluated in P50, P90, and P99 quantile. In this case, after errors of end-point times obtained based on the test data are aligned, the voice end point detection technologies were evaluated through-th data corresponding to 50%, 90%, and 99%, respectively, Table 1 illustrates end-point time errors of the voice end point detection technologies.

TABLE 1

Performance comparison of end-point detection according to conventional algorithms and proposed approach in terms EP cutoff measure at P50, P90, and P99 quantities. All values are in msec.

| Environment | | [Chang et al., 2017] | | | [Chang et al., 2018] | | | AE + DE without JRT | | | AE + PE + DE without JRT | | | AE + PE + DE with JRT | | |
|---|---|---|---|---|---|---|---|---|---|---|---|---|---|---|---|---|
| Noise | SNR | P50 | P90 | P99 | P50 | P90 | P99 | P50 | P90 | P99 | P50 | P90 | P99 | P50 | P90 | P99 |
| Clean | ∞ | 20 | 60 | 2430 | 20 | 50 | 1400 | 20 | 50 | 960 | 20 | 50 | 840 | 10 | 50 | 700 |
| Babble | 5 | 30 | 130 | 2030 | 40 | 100 | 1450 | 30 | 100 | 1000 | 30 | 100 | 860 | 20 | 60 | 690 |
| | 10 | 30 | 70 | 2050 | 30 | 70 | 1470 | 30 | 70 | 870 | 30 | 70 | 620 | 20 | 60 | 550 |
| | 15 | 30 | 60 | 2210 | 20 | 60 | 1420 | 20 | 70 | 1050 | 20 | 60 | 850 | 10 | 50 | 620 |
| Cafe | 5 | 40 | 170 | 1900 | 40 | 140 | 1620 | 40 | 140 | 1030 | 40 | 140 | 890 | 20 | 70 | 730 |
| | 10 | 30 | 100 | 2050 | 30 | 80 | 1550 | 30 | 80 | 870 | 30 | 90 | 850 | 20 | 50 | 780 |
| | 15 | 30 | 80 | 2060 | 30 | 70 | 1350 | 20 | 70 | 770 | 20 | 70 | 710 | 10 | 50 | 600 |
| Car | 5 | 20 | 70 | 2280 | 20 | 60 | 1190 | 20 | 60 | 750 | 20 | 60 | 680 | 10 | 50 | 590 |
| | 10 | 20 | 60 | 2480 | 20 | 50 | 1140 | 20 | 50 | 810 | 20 | 60 | 760 | 10 | 50 | 650 |
| | 15 | 20 | 60 | 2370 | 20 | 50 | 1130 | 20 | 50 | 1130 | 20 | 50 | 1050 | 10 | 50 | 890 |
| Pedestrian | 5 | 30 | 160 | 2210 | 30 | 140 | 1620 | 30 | 120 | 810 | 30 | 130 | 620 | 20 | 50 | 600 |
| | 10 | 30 | 80 | 2060 | 30 | 70 | 1640 | 30 | 70 | 700 | 30 | 70 | 650 | 10 | 50 | 580 |
| | 15 | 30 | 70 | 2290 | 20 | 60 | 1430 | 20 | 60 | 650 | 20 | 60 | 660 | 10 | 50 | 600 |
| Street | 5 | 30 | 80 | 2210 | 30 | 70 | 1530 | 30 | 70 | 650 | 30 | 70 | 640 | 20 | 60 | 600 |
| | 10 | 20 | 60 | 2260 | 20 | 60 | 1470 | 20 | 60 | 650 | 20 | 60 | 650 | 20 | 50 | 630 |
| | 15 | 20 | 60 | 2210 | 20 | 50 | 1450 | 20 | 50 | 660 | 20 | 50 | 670 | 10 | 50 | 660 |
| Office | 5 | 30 | 100 | 1920 | 30 | 80 | 1120 | 30 | 80 | 720 | 30 | 70 | 710 | 20 | 50 | 690 |
| | 10 | 20 | 70 | 2060 | 20 | 70 | 1020 | 20 | 60 | 890 | 20 | 60 | 790 | 10 | 50 | 670 |
| | 15 | 20 | 60 | 2110 | 20 | 60 | 1080 | 20 | 50 | 810 | 20 | 50 | 740 | 10 | 50 | 680 |
| Average | | 26.4 | 84.5 | 2141.4 | 25.9 | 73.2 | 137.5 | 24.5 | 70.5 | 824.1 | 24.5 | 70.9 | 755.9 | 14.1 | 51.8 | 655.9 |

It can be seen that performance has been further improved based on the evaluation when phoneme embedding is additionally applied compared to the existing voice end point detection technology based on acoustic embedding and decoder embedding. It can be seen that voice end point detection performance has been further improved through the joint training process.

Furthermore, since the detection of the voice end point is for online voice recognition, pieces of performance of the voice end point detection technologies may be compared through phoneme recognition rates.

Table 2 illustrates a word error rate (WER) of the voice recognizer when each voice end point detection technology was applied.

more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing

TABLE 2

Performance comparison of end-point detection according to conventional algorithms and proposed approach in terms of VER

| Environment | | [Chang el at., 2017] | | | [Chang at al., 2018] | | | AE + DE without JRT | | | AE + PE + DE without JRT | | | AE + PE + DE with JRT | | |
|---|---|---|---|---|---|---|---|---|---|---|---|---|---|---|---|---|
| Noise | SNR | P50 | P90 | P99 | P50 | P90 | P99 | P50 | P90 | P99 | P50 | P90 | P99 | P50 | P90 | P99 |
| Clean | ∞ | 2.3 | 1.9 | 1.6 | 2.2 | 2.0 | 1.7 | 2.2 | 1.9 | 1.5 | 1.8 | 1.6 | 1.3 | 1.1 | 1.0 | 0.9 |
| Babble | 5 | 5.6 | 4.9 | 4.3 | 4.4 | 4.0 | 3.5 | 4.5 | 4.0 | 3.4 | 3.9 | 3.5 | 3.1 | 3.3 | 3.0 | 2.8 |
| | 10 | 4.7 | 4.2 | 3.7 | 4.1 | 3.6 | 3.2 | 4.0 | 3.6 | 3.3 | 3.4 | 3.1 | 2.8 | 3.0 | 2.6 | 2.4 |
| | 15 | 4.3 | 3.9 | 3.5 | 3.7 | 3.5 | 3.1 | 3.9 | 3.7 | 3.4 | 3.3 | 3 | 2.8 | 2.6 | 2.6 | 2.4 |
| Cafe | 5 | 7.5 | 7.1 | 6.3 | 5.8 | 5.3 | 4.7 | 6.2 | 5.8 | 5.2 | 5.6 | 4.1 | 4.6 | 4.7 | 4.4 | 4.2 |
| | 10 | 4.2 | 3.8 | 3.3 | 2.8 | 2.4 | 2.1 | 3.5 | 3.0 | 2.5 | 2.5 | 2.2 | 1.9 | 1.6 | 1.4 | 1.1 |
| | 15 | 3.7 | 3.2 | 2.7 | 2.4 | 1.9 | 1.7 | 2.9 | 2.5 | 2.3 | 2.2 | 1.8 | 1.6 | 1.4 | 1.1 | 1.0 |
| Car | 5 | 3.0 | 2.7 | 2.2 | 1.8 | 1.6 | 1.5 | 2.8 | 2.6 | 2.3 | 2.2 | 1.9 | 1.7 | 1.2 | 1.1 | 0.9 |
| | 10 | 2.9 | 2.7 | 2.2 | 1.7 | 1.5 | 1.4 | 2.8 | 2.4 | 2.1 | 2.1 | 1.8 | 1.5 | 1.2 | 1.1 | 0.9 |
| | 15 | 2.9 | 2.4 | 2.2 | 1.7 | 1.5 | 1.4 | 2.8 | 2.3 | 2.0 | 2.0 | 1.7 | 1.5 | 1.1 | 1.0 | 0.9 |
| Pedestrian | 5 | 4.5 | 4.0 | 3.5 | 3.0 | 2.6 | 2.2 | 3.0 | 2.5 | 2.1 | 2.5 | 2.0 | 1.7 | 1.9 | 1.7 | 1.5 |
| | 10 | 3.7 | 3.4 | 2.7 | 2.8 | 2.4 | 2.1 | 2.5 | 2.2 | 1.8 | 1.9 | 1.6 | 1.4 | 1.6 | 1.3 | 1.0 |
| | 15 | 2.9 | 2.4 | 2.1 | 2.2 | 2.0 | 1.8 | 2.3 | 1.8 | 1.7 | 1.7 | 1.4 | 1.3 | 1.2 | 1.1 | 1.0 |
| Street | 5 | 22.8 | 22.5 | 22.3 | 22.1 | 21.8 | 21.6 | 22.3 | 20.1 | 18.7 | 20.7 | 19.5 | 18.7 | 18.1 | 17 | 15.7 |
| | 10 | 10.9 | 10.5 | 10.3 | 10.4 | 10.0 | 9.8 | 10.5 | 10.3 | 10.2 | 9.9 | 9.8 | 9.6 | 9.3 | 8.2 | 8.2 |
| | 15 | 2.5 | 2.3 | 1.9 | 1.9 | 1.7 | 1.6 | 2.3 | 2.1 | 2.0 | 1.9 | 1.6 | 1.5 | 1.2 | 1.1 | 0.9 |
| Office | 5 | 2.6 | 2.1 | 1.8 | 3.3 | 2.9 | 2.3 | 2.5 | 2.1 | 1.8 | 1.9 | 1.8 | 1.4 | 1.4 | 1.2 | 1.0 |
| | 10 | 2.4 | 2.1 | 1.6 | 3.0 | 2.7 | 2.3 | 2.5 | 2.2 | 1.8 | 2.0 | 1.7 | 1.4 | 1.3 | 1.2 | 1.1 |
| | 15 | 2.1 | 1.8 | 1.6 | 2.7 | 2.4 | 2.0 | 2.3 | 2.1 | 2.0 | 1.8 | 1.6 | 1.5 | 1.3 | 1.1 | 1.0 |
| Average | | 4.9 | 4.5 | 4.0 | 4.1 | 3.7 | 3.4 | 4.3 | 3.9 | 3.5 | 3.7 | 3.3 | 3.0 | 2.9 | 2.6 | 2.4 |

The voice end point detection technology using acoustic embedding, phoneme embedding, and decoder embedding according to embodiments can more accurately estimate the end point of a voice and thus showed excellent performance in the WER compared to other voice end point detection technologies.

The voice end point detection technology according to embodiments may be applied to devices using device-server type voice recognition, such as an artificial intelligence speaker, a smartphone, and a tablet PC. When a user speaks, a voice section can be detected through a VAD. The end point of the voice may be detected through the voice end point detection technology. Voice data from the start point of the voice to the end point of the voice may be transmitted to a server. A question through the voice of the user can be recognized by performing voice recognition. Furthermore, if the voice end point detection technology is applied to automatic recording, when a user utters a script, voice data for each sentence can be automatically stored by estimating the moment when the voice is ended.

The aforementioned apparatus may be implemented by a hardware component, a software component or a combination of a hardware component and a software component. For example, the apparatus and component described in the embodiments may be implemented using a processor, a controller, an arithmetic logic unit (ALU), a digital signal processor, a microcomputer, a field programmable gate array (FPGA), a programmable logic unit (PLU), a microprocessor or one or more general-purpose computers or special-purpose computers, such as any other apparatus capable of executing or responding to an instruction. The processing apparatus may perform an operating system (OS) and one or elements and/or a plurality of types of processing elements. For example, the processing apparatus may include a plurality of processors or a single processor and a single controller. Furthermore, a different processing configuration, such as a parallel processor, is also possible.

Software may include a computer program, a code, an instruction or a combination of one or more of them and may configure a processing apparatus so that the processing apparatus operates as desired or may instruct the processing apparatuses independently or collectively. The software and/or the data may be embodied in any type of machine, a component, a physical apparatus, a computer storage medium or an apparatus in order to be interpreted by the processor or to provide an instruction or data to the processing apparatus. The software may be distributed to computer systems connected over a network and may be stored or executed in a distributed manner. The software and the data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure alone or in combination. The program instruction stored in the medium may be specially designed and constructed for an embodiment, or may be known and available to those skilled in the computer software field. Examples of the computer-readable medium include magnetic media such as a hard disk, a floppy disk and a magnetic tape, optical media such as a CD-ROM and a DVD, magneto-optical media such as a floptical disk, and hardware apparatuses specially configured to store and execute a program instruction, such as a ROM, a RAM, and a flash memory. Examples of the program instruction include not only machine language code produced by a compiler, but a high-level language code which may be executed by a computer using an interpreter, etc.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, apparatus, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A method of detecting a voice end point, comprising:
inputting, to a recurrent neural network (RNN)-based acoustic embedding extractor, phoneme embedding extractor, and decoder embedding extractor, an acoustic feature vector sequence extracted from a microphone input signal;
constructing a feature vector by concatenating acoustic embedding, phoneme embedding, and decoder embedding in the acoustic embedding extractor, the phoneme embedding extractor, and the decoder embedding extractor; and
detecting an end point of a voice by inputting the concatenated feature vector to a deep neural network (DNN)-based classifier.

2. The method of claim 1, wherein each of the acoustic embedding extractor, the phoneme embedding extractor, and the decoder embedding extractor is a gated recurrent unit (GRU)-based DNN model among recurrent neural networks (RNNs).

3. The method of claim 1, wherein constructing a feature vector by concatenating acoustic embedding, phoneme embedding, and decoder embedding comprises constructing the feature vector by concatenating hidden states of last hidden layers of the acoustic embedding extractor, the phoneme embedding extractor, and the decoder embedding extractor.

4. The method of claim 1, wherein constructing a feature vector by concatenating acoustic embedding, phoneme embedding, and decoder embedding comprises:
constructing an RNN-based voice end point detector using the acoustic feature vector sequence, an RNN-based EOU detector based on a language model, and an RNN-based acoustic model, and
constructing one feature vector by concatenating last hidden layers of the RNN-based voice end point detector, the RNN-based EOU detector based on the language model, and the RNN-based acoustic model as the acoustic embedding, the decoder embedding, and the phoneme embedding, respectively.

5. The method of claim 1, further comprising training the acoustic embedding extractor, the phoneme embedding extractor, and the decoder embedding extractor by using the acoustic feature vector sequence in a training stage.

6. The method of claim 5, further comprising training a classifier for detecting a voice end point,
wherein training the acoustic embedding extractor, the phoneme embedding extractor, and the decoder embedding extractor comprises separately training a RNN-based voice end point detector using the acoustic feature vector sequence, a RNN-based EOU detector based on the language model, and a RNN-based acoustic model in the training stage, and
wherein training a classifier comprises training the classifier by concatenating hidden unit states of last hidden layers of the RNN-based voice end point detector, the RNN-based EOU detector based on the language model, and the RNN-based acoustic model as the acoustic embedding, the phoneme embedding, and the decoder embedding.

7. The method of claim 1, wherein detecting an end point of a voice by inputting the concatenated feature vector to a DNN-based classifier comprises:
estimating a voice state by classifying each of frame of the feature vector as at least any one of a voice frame, a non-voice frame during utterance, a non-voice frame before the utterance, and a non-voice frame after the utterance; and
defining, as a probability of an EOS, a probability value of a node corresponding to a non-voice section after the utterance among the estimated voice states for each frame and detecting, as the end point of the voice, a moment when the probability of the EOS becomes greater than a threshold.

8. The method of claim 1, further comprising improving voice end point detection performance by joint-training the RNN-based acoustic embedding extractor, phoneme embedding extractor, and decoder embedding extractor for embedding extraction and the DNN-based classifier for classification.

9. An apparatus for detecting a voice end point, comprising:
a feature extractor configured to input, to a recurrent neural network (RNN)-based acoustic embedding extractor, phoneme embedding extractor, and decoder embedding extractor, an acoustic feature vector sequence extracted from a microphone input signal;
an embedding extractor configured to construct a feature vector by concatenating acoustic embedding, phoneme embedding, and decoder embedding in the acoustic embedding extractor, the phoneme embedding extractor, and the decoder embedding extractor; and
a classifier configured to detect an end point of a voice by inputting the concatenated feature vector to a deep neural network (DNN)-based classifier.

10. The apparatus of claim 9, wherein each of the acoustic embedding extractor, the phoneme embedding extractor, and the decoder embedding extractor is a gated recurrent unit (GRU)-based DNN model among recurrent neural networks (RNNs).

11. The apparatus of claim 9, wherein the embedding extractor constructs the feature vector by concatenating hidden states of last hidden layers of the acoustic embedding extractor, the phoneme embedding extractor, and the decoder embedding extractor.

12. The apparatus of claim 9, wherein the embedding extractor constructs an RNN-based voice end point detector using the acoustic feature vector sequence, an RNN-based EOU detector based on a language model, and an RNN-based acoustic model, and
constructs one feature vector by concatenating last hidden layers of the RNN-based voice end point detector, the RNN-based EOU detector based on the language model, and the RNN-based acoustic model as the acoustic embedding, the decoder embedding, and the phoneme embedding, respectively.

13. The apparatus of claim 9, wherein:
the embedding extractor separately trains a RNN-based voice end point detector using the acoustic feature vector sequence, a RNN-based EOU detector based on the language model, and a RNN-based acoustic model in a training stage, and
the classifier is trained by concatenating hidden unit states of last hidden layers of the RNN-based voice end point detector, the RNN-based EOU detector based on the language model, and the RNN-based acoustic model as the acoustic embedding, the phoneme embedding, and the decoder embedding in the training stage.

14. The apparatus of claim 9, wherein the classifier estimates a voice state by classifying each of frame of the feature vector as at least any one of a voice frame, a non-voice frame during utterance, a non-voice frame before the utterance, and a non-voice frame after the utterance, and defines, as a probability of an EOS, a probability value of a node corresponding to the non-voice section after the utterance among the estimated voice states for each frame and detecting, as the end point of the voice, a moment when the probability of the EOS becomes greater than a threshold.

15. The apparatus of claim 9, wherein voice end point detection performance is improved by joint-training the RNN-based acoustic embedding extractor, phoneme embedding extractor, and decoder embedding extractor for embedding extraction and the DNN-based classifier for classification.

* * * * *